Aug. 3, 1926.  
C. N. HEADDING ET AL  
PROJECTING DEVICE  
Original Filed May 4, 1923  5 Sheets-Sheet 1
1,594,952
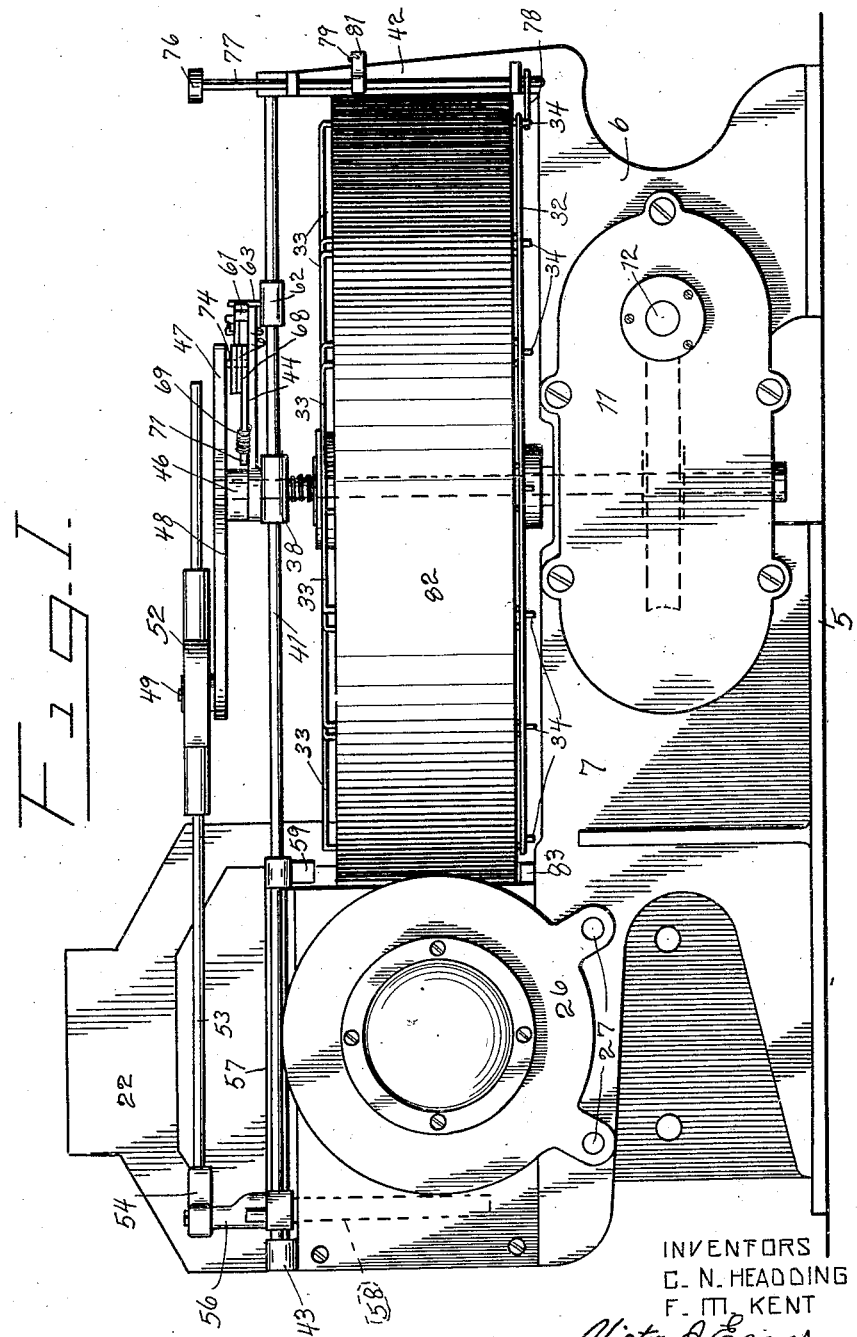
INVENTORS  
C. N. HEADDING  
F. M. KENT  
Victor J. Evans  
ATTORNEY

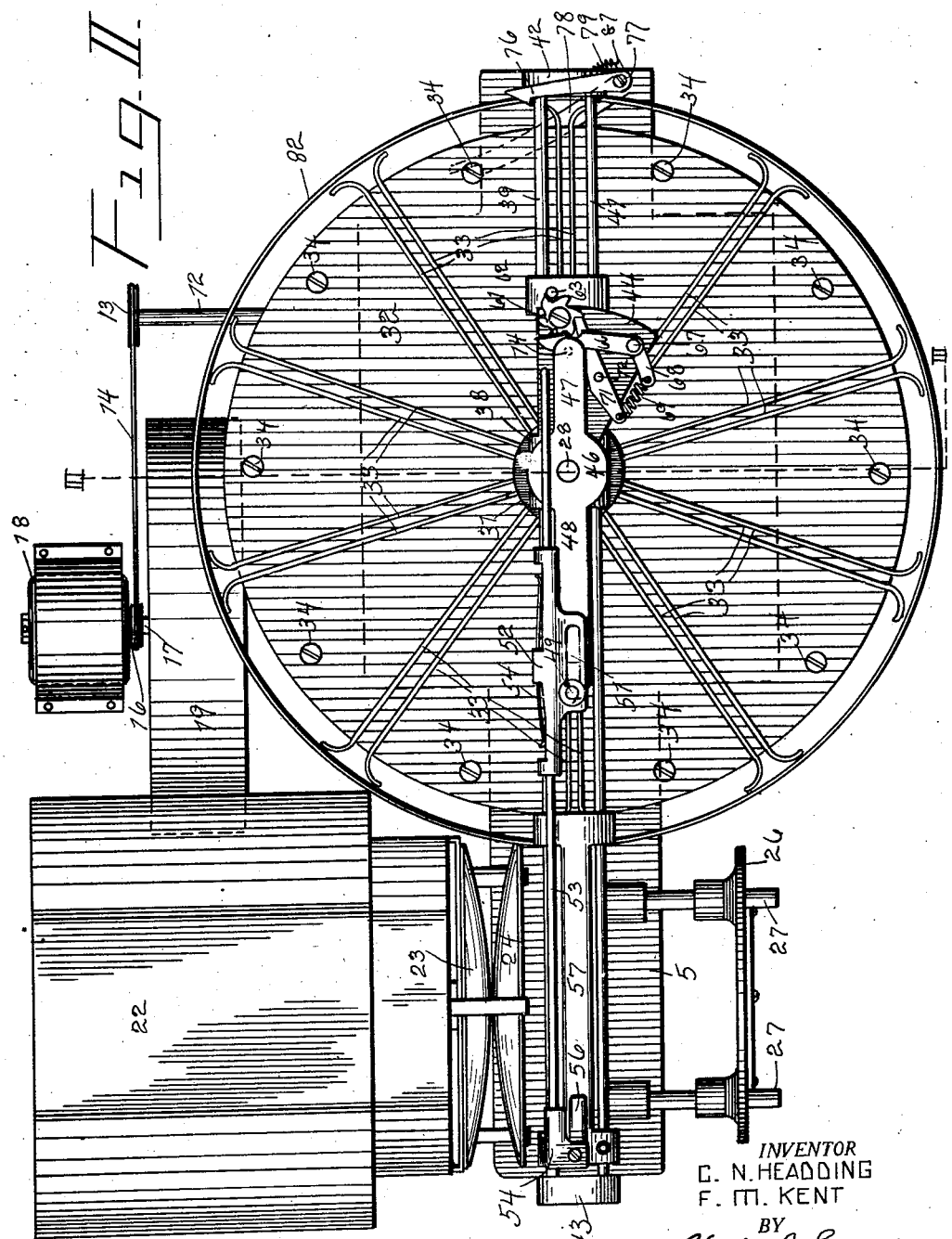

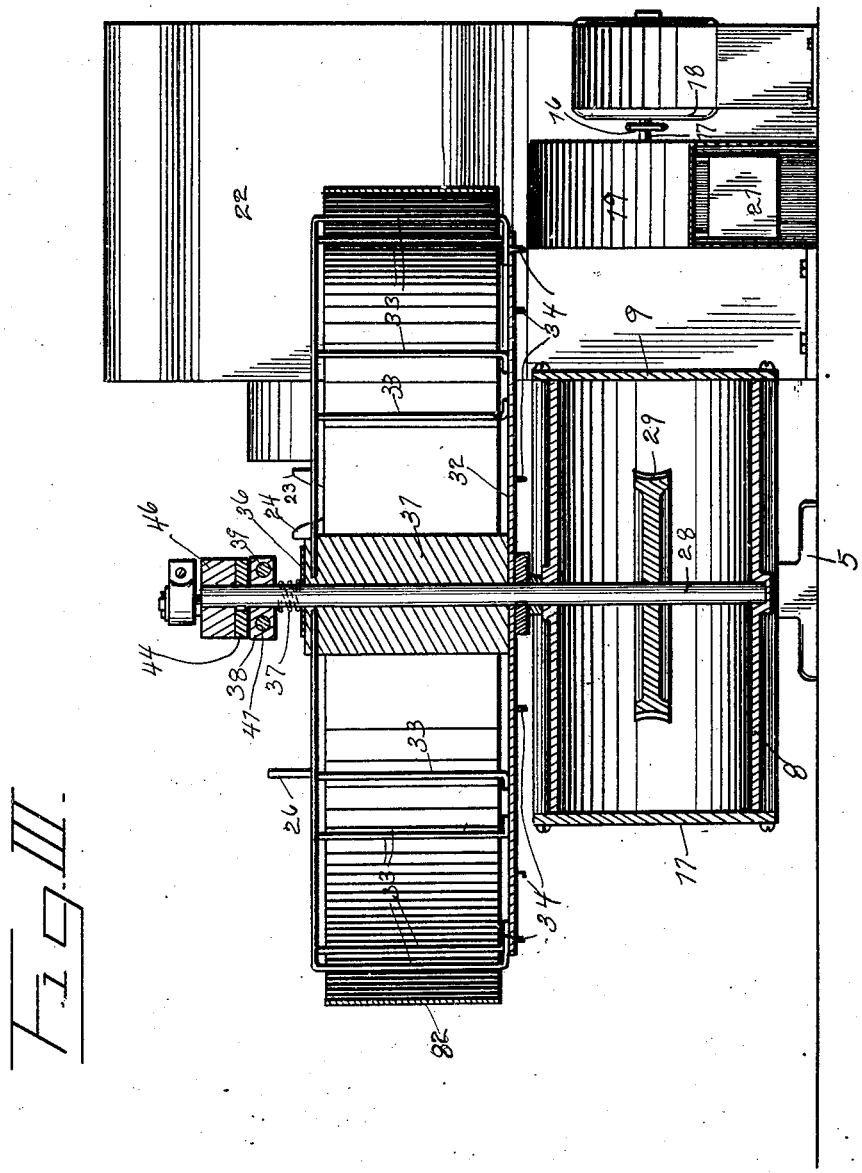

Aug. 3, 1926.
C. N. HEADDING ET AL
1,594,952
PROJECTING DEVICE
Original Filed May 4, 1923    5 Sheets-Sheet 4
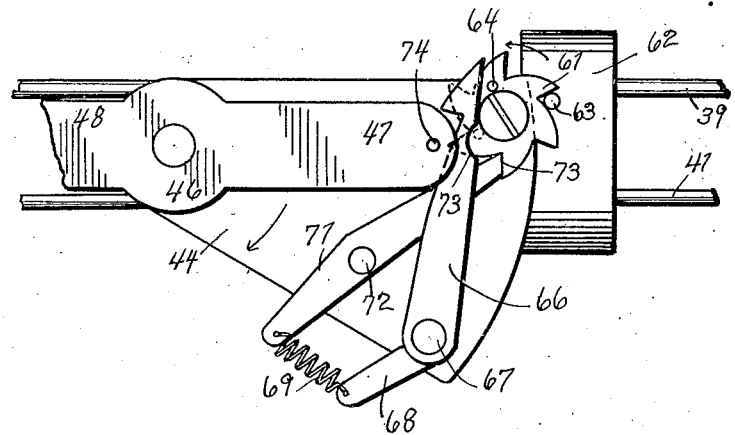
Fig. IV.
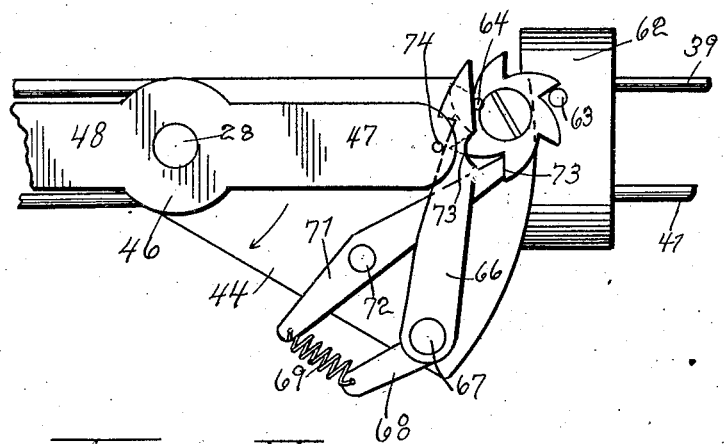
Fig. V.
INVENTOR
C. N. HEADDING
F. M. KENT
BY
Victor J. Evans
ATTORNEY

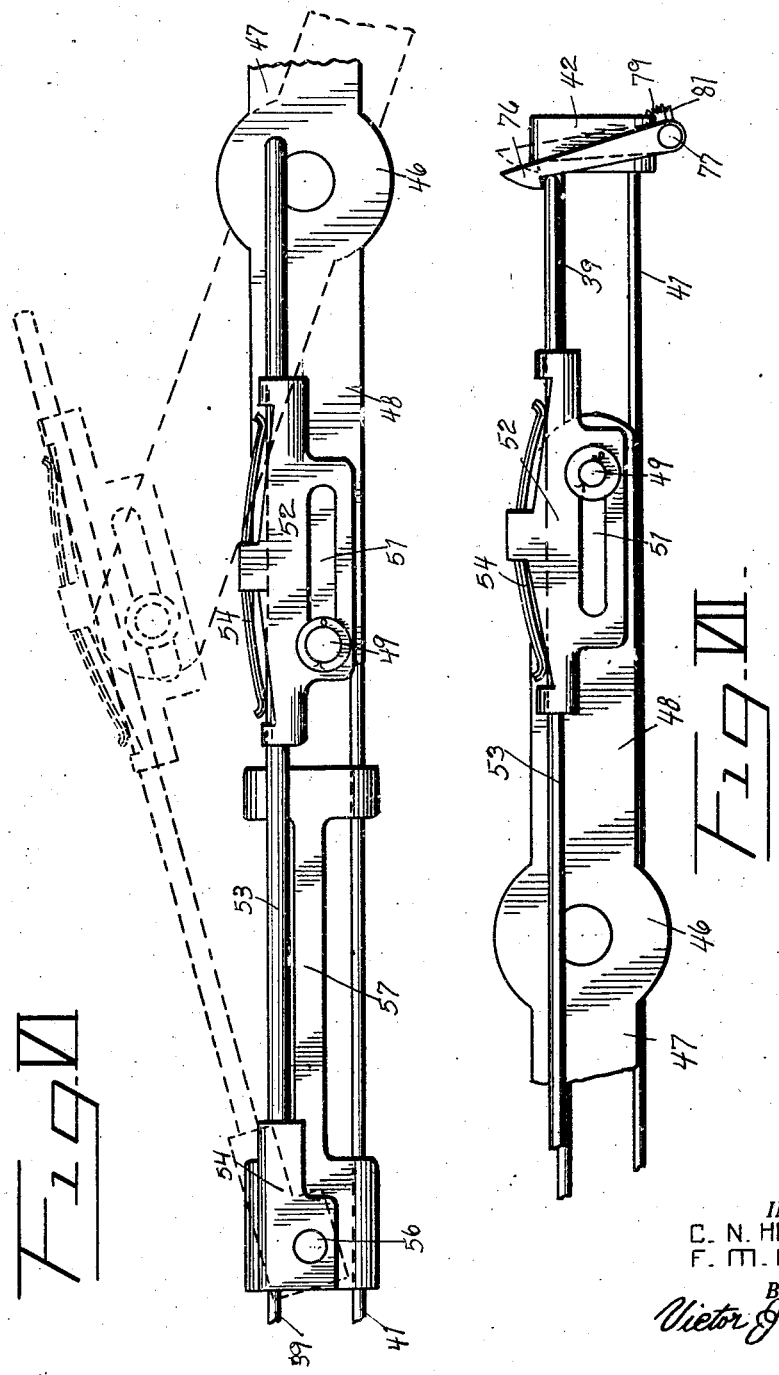

Patented Aug. 3, 1926.

1,594,952

UNITED STATES PATENT OFFICE.

CLAY N. HEADDING AND FRANCIS MITCHELL KENT, OF CHEHALIS, WASHINGTON.

PROJECTING DEVICE.

Application filed May 4, 1923, Serial No. 636,645. Renewed December 29, 1925.

This invention relates to improvements in projecting devices and has particular references to a projector which automatically projects a slide upon a screen changing the slide automatically at stated intervals.

Another object is to produce a device of this character which is fool proof and one which if the parts become deranged, will not in any way damage the slides.

Another object is to produce a device which is cheap to manufacture, simple in construction and small in size.

Other objects and advantages will be apparent during the course of the following description.

In the accompanying drawings forming a part of this specification, and in which like numerals are employed to designate like parts throughout the same, Figure 1 is a front elevation of our device, Figure 2 is a top plan view of Figure 1, Figure 3 is a cross section taken on the line 3—3 of Figure 2, Figures 4 and 5 are enlarged detail views of the magazine controlling mechanism, Figure 6 is a fragmentary top plan view of the slide operating mechanism, and Figure 7 is a top plan view of the slide mechanism showing the manner in which it operates the magazine latch.

Applicants are aware of the fact that many types of projectors have been placed upon the market employing slides which are automatically moved into and out of the path of the projector. These mechanisms, however, have been complicated and in many instances were of such a nature that if a slide became deranged or jammed the mechanism would keep on operating with the result that the slide would be destroyed.

We have therefore provided a machine wherein the slides are automatically moved into and out of the path of the projector and have further provided means whereby the mechanism may run continuously without damaging one of the slides should it become deranged in any manner.

We have further provided means for automatically shifting a magazine so as to present a new slide or any one of a selected group of slides.

In the accompanying drawings wherein for the purpose of illustration is shown a preferred embodiment of our invention, the numeral 5 designates the base of our machine, which base is provided with upwardly projecting fins as shown at 6 and 7. These fins are connected together by a hollow elliptical casting 8 formed integral with the fins 6 and 7. This casting 8 has its ends closed as by plates 9 and 11. These plates also serve to support a shaft 12 having a worm thereon, which worm is not shown.

This shaft 12 carries a pulley 13, which pulley is driven through the medium of a belt 14 extending about a pulley 16 secured upon a shaft 17. This shaft is in turn connected to a motor 18. The motor shaft 17 also extends into a housing 19 and has secured thereto a series of fan blades, one of which is shown at 21, the result being that a blower is thus formed, which blower transmits a current of air to the lamp housing 22, within which the ordinary projecting light is placed.

At 23 and 24 are shown the usual condensing lenses. Mounted in front of these condensing lenses is a projecting lens holder 26 which is adjustable upon the slides 27.

Referring now to Figure 3, it will be noted that a shaft 28 extends upwardly through the casting 8 and has mounted thereon a gear 29 which gear is adapted to mesh with the worm previously mentioned upon the shaft 12.

This shaft has mounted thereon a hub 31 of the slide magazine, which comprises a base 32 which is circular in shape as is best shown in Figure 2. Secured to this base is a plurality of guide wires as shown at 33. These guide wires have their ends flared as is best shown in Figure 2, the purpose of which will be hereinafter seen.

At 34 we have shown stops projecting downwardly from the base 32, the purpose of which will be later seen. Contacting the hub 31 is a washer 36 against which one end of a spring 37 bears. This spring 37 is coiled about the shaft 28 and contacts the under side of a bearing member 38. This bearing member 38 is supported by parallel rods 39 and 41 extending across the entire length of the machine as best shown in Figure 2. The extremities of these rods are mounted in the supports 42 and 43 which are integral with the webs 6 and 7.

Keyed to the shaft 28 is a plate 44 and freely rotatable upon the upper extremity of the shaft 28 is a hub 46 having arms 47 and 48 formed integral therewith. The arm 48 has an upstanding pin 49 secured thereto. This pin is adapted to pass through a slot 51 formed in a slider 52. This slider is moved on a rod 53 and held in frictional engagement therewith as by springs 54 which contact the rod 53.

This rod 53 is in turn connected to a member 54 pivoted upon an upstanding lug 56 integral with a slide carrier 57, which slide carrier is movable upon the rods 39 and 41. This slide carrier is provided with a downwardly extending slide engaging member shown in dotted lines at 58 and has a short downwardly extending member 59 formed upon its opposite end.

Referring now to Figures 4 and 5 it will be noted that a ratchet wheel 61 is rotatably secured near one corner of the plate 44. It will also be noted that a block 62 is positioned upon the rods 39 and 41 and that this block carries a pin 63 which pin is adapted to contact one of the teeth of the ratchet 61. This ratchet carries a pin 64 upon its upper surface, which pin is adapted to contact the end of a latch 66. This latch is pivoted as shown at 67 to the plate 44 and has an arm 68 to which a spring 69 is secured. The opposite end of this spring 69 is secured to a dog 71 pivoted at 72 to the plate 44 and having its nose in contact with the ratchet 61 as shown at 73. It will be noted that the latch 66 has a depression 73 formed upon its right hand edge as shown in the drawing. It will also be noted that a pin 74 is mounted in the arm 47 which pin projects downwardly and is adapted to be engaged by the latch 66, under certain conditions as will be hereinafter explained.

By now referring to Figures 1, 2 and 7, it will be noted that the end of the rod 53 is in alignment with a latch 76 and when the same has been moved to the position shown in Figure 7, it will have contacted the nose of this latch 42 and cammed the same to the dotted line position in this figure. During the moment of camming, the shaft 77 pivotally mounted upon the upright 42 will have been given a partial rotation with the result that the dog 78 secured to the lower end of the shaft will have moved out of the path of the stop 34, during which instant the magazine will turn sufficiently so that as the dog returns to its normal position it will be in line with the nearest stop 34 which will shortly contact the dog. The return movement of the dog, shaft and latch is controlled through the medium of a spring 79 having one end secured to the upright 42 and having its opposite end secured to the arm 81, which arm is in turn secured to the shaft 77.

A circular shield 82 surrounds the slide magazine and has a slot provided through which the slides may pass to and from the projecting position. In order that the slides may align themselves properly, we have provided an incline 83 (see Fig. 1) which incline causes the front edge of the slide to be lifted slightly above the base 32 thus preventing any possibility of the slide sticking, through mis-alignment.

The operation of our device is as follows:—

Assuming that the parts are arranged as shown in Figures 1 and 2 and that the magazine is filled with slides, we will assume that a slide is now being projected, that the motor is running with the result that a blast of air is being driven through the lamp housing thus dissipating the heat and keeping the same cold. At the same time this same motor is rotating the shaft 12 together with its worm, which movement is transmitted through the gear 29 to the shaft 28. As the plate 44 is keyed to the shaft 28 the same will revolve continuously, with the result that as the ratchet wheel 61 movs into contact with the pin 63 on the block 62, the same will be caused to rotate one-sixth of a revolution and to hold its position through the action of the nose of the dog 71. During the five revolutions of the shaft the pin 64 will move from its dotted line position in Figure 4 to its full line position.

During these five revolutions the latch 66 will be out of the path of the pin 74 and consequently the arm 47 and its associated parts will remain in their normal position, as shown in full lines in Figures 1 and 2. Upon the next or sixth revolution the pin 64 will be moved into contact with the latch 66 as shown in Figure 5 which will move the latch 66 into engagement with the pin 74 where it will be held during one complete revolution. During the first part of this revolution, the parts will move as shown in dotted lines in Figure 6. As the revolution proceeds through the first 180° the slide which is being projected will be withdrawn and at the instance the rod 53 contacts the end of the latch 74 the dog 78 will be moved out of engagement with its stop 34, which will immediately allow the magazine through its friction drive to rotate and as soon as the dog 78 is returned to its normal position the rotation of the magazine will be stopped by its engagement with the next pin.

It will here be noted that the pins may be arranged as desired so that one or more spaces may be skipped as the magazine travels fast enough to accommodate for considerable rotation before the slide changing mechanism can commence to operate.

By viewing Figure 7 it will be noted that the pin 49 is now at the opposite end of the slot 51 with the result that a considerable rotation of the arm 48 takes place before the movement is again transmitted to the rod 53. This lost motion allows for the changing of the position of the magazine as above described. Thus the remainder of the 180° returns the parts to the position shown in Figure 1, and immediately the ratchet wheel 61 contacts the pin 63, the pin 64 moves to its dotted line position of Figure 4 and releases the latch 66 from its engagement with the pin 74, after which five more complete revolutions of the shaft take place before the slide changing mechanism is again brought into operation. Should one of the slides become jammed in any way so that the slide engaging member 57 will not move, then the slider 52 will move upon the rod 53 due to the fact that it is merely held thereon through the medium of the spring 54.

It will thus be seen that we have provided an automatic projecting mechanism capable of projecting a series of slides or certain slides of a series and mechanism which is simple, positive in operation and one which will not injure the slides should one become jammed in any way.

It is to be understood that the form of our invention herewith shown and described is to be taken as a preferred example of the same and that various changes in the shape, size and arrangement of parts may be resorted to without departing from the spirit of the invention or the scope of the subjoined claims.

Having thus described our invention, we claim:—

1. In a projecting mechanism, a vertically disposed shaft, means for continuously rotating said shaft, a slide magazine mounted on said shaft friction means carried by said shaft for rotating said magazine and to be frictionally rotated by said shaft, latch means for preventing continuous rotation of said slide magazine, a plate secured to said shaft, a freely rotatable hub mounted on the upper extremity of said shaft and having outwardly disposed arms, a downward extending pin positioned in one of said arms, a latch positioned on said plate, means positioned on said plate for intermittently moving said latch into the path of said pin and slide actuating means secured to the other of said arms, substantially as and for the purpose specified.

2. In a projecting mechanism, a vertically disposed continuously rotating shaft, a freely rotatable slide magazine mounted on said shaft, downwardly projecting stops mounted on said magazine, a dog adapted to abut said stops in succession, means for normally maintaining said dog in contact with one of said stops, a latch adapted to control the movement of said dog, a plate secured to said shaft, a latch pivotally mounted on said plate, a ratchet wheel mounted on said plate, a pin carried on said ratchet wheel and adapted to move said latch about its pivot point at predetermined intervals, a hub portion freely mounted on the upper extremity of said shaft and having outwardly extending arms, a downwardly extending pin mounted on one of said arms and adapted to be engaged by said last mentioned latch when said latch is moved by said pin carried on said ratchet wheel, an upwardly extending pin secured to the other of said arms, a slider slidably engaging said last mentioned pin, a rod frictionally held in said slider, and a slide carrier pivotally secured to said rod, substantially as and for the purpose specified.

In testimony whereof we affix our signatures.

FRANCIS MITCHELL KENT.
CLAY N. HEADDING.